United States Patent
Ramasubramanian et al.

(10) Patent No.: US 10,649,069 B2
(45) Date of Patent: May 12, 2020

(54) SYNCHRONIZATION IN FMCW RADAR SYSTEMS

(71) Applicant: TEXAS INSTRUMENTS INCORPORATED, Dallas, TX (US)

(72) Inventors: Karthik Ramasubramanian, Bangalore (IN); Karthik Subburaj, Bangalore (IN); Sachin Bhardwaj, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 408 days.

(21) Appl. No.: 15/635,659

(22) Filed: Jun. 28, 2017

(65) Prior Publication Data

US 2017/0299693 A1  Oct. 19, 2017

Related U.S. Application Data

(63) Continuation of application No. 14/637,218, filed on Mar. 3, 2015, now abandoned.

(30) Foreign Application Priority Data

Mar. 28, 2014  (IN) .......................... 1667/CHE/2014

(51) Int. Cl.
*G01S 13/90* (2006.01)
*G01S 7/35* (2006.01)
*G01S 13/58* (2006.01)
*G01S 13/931* (2020.01)
*G01S 13/34* (2006.01)
*G01S 13/72* (2006.01)
*G01S 13/02* (2006.01)

(52) U.S. Cl.
CPC .............. *G01S 7/35* (2013.01); *G01S 13/343* (2013.01); *G01S 13/584* (2013.01); *G01S 13/931* (2013.01); *G01S 13/726* (2013.01); *G01S 2013/0245* (2013.01)

(58) Field of Classification Search
CPC .... G01S 13/343; G01S 13/584; G01S 13/726; G01S 13/931; G01S 2013/0245; G01S 7/35
USPC ........................................................ 342/107
See application file for complete search history.

(56) References Cited

U.S. PATENT DOCUMENTS 3,842,417 A * 10/1974 Williams .................. G01S 7/12
342/158

* cited by examiner

*Primary Examiner* — Timothy A Brainard
(74) *Attorney, Agent, or Firm* — John R. Pessetto; Charles A. Brill; Frank D. Cimino

(57) ABSTRACT

The disclosure provides a radar apparatus for estimating a position and a velocity of the plurality of obstacles. The radar apparatus includes a local oscillator that generates a first signal. A first transmit unit receives the first signal from the local oscillator and generates a first transmit signal. A frequency shifter receives the first signal from the local oscillator and generates a second signal. A second transmit unit receives the second signal and generates a second transmit signal. The frequency shifter provides a frequency offset to the first signal based on a routing delay mismatch to generate the second signal such that the first transmit signal is phase coherent with the second transmit signal.

16 Claims, 2 Drawing Sheets

SYNCHRONIZATION IN FMCW RADAR SYSTEMS

CROSS REFERENCES TO RELATED APPLICATION(S)

This continuation application claims priority to U.S. patent application Ser. No. 14/637,218, filed Mar. 3, 2015, which application claims priority from India provisional patent application No. 1667/CHE/2014 filed on Mar. 28, 2014, both of which applications are hereby incorporated by reference in their entirety.

TECHNICAL FIELD

The present disclosure relates to radars, and more particularly to estimating position and the velocity of one or more obstacles using radars.

BACKGROUND

The use of radars in industrial and automotive applications is evolving rapidly. Radars are used in many applications to detect target objects such as airplanes, military targets, vehicles, and pedestrians. Radar finds use in number of applications associated with a vehicle such as adaptive cruise control, collision warning, blind spot warning, lane change assist, parking assist and rear collision warning. Pulse radar and FMCW (Frequency Modulation Continuous Wave) radar are predominately used in such applications.

In a radar system, a local oscillator generates a transmit signal. The transmit signal is amplified and transmitted by one or more transmit units. In an FMCW radar, a frequency of the transmit signal is varied linearly with time. For example, the frequency of the transmit signal increases at a constant rate from 77 GHz to 81 GHz in 100 micro-seconds. This transmit signal is referred as a ramp signal or a chirp signal. One or more obstacles scatters the transmit signal. The scattered signal is received by one or more receive units in the radar system.

A signal obtained by mixing the transmitted signal and the received scattered signal is termed as a beat signal. The beat signal is sampled by an analog to digital converter (ADC) and processed by a processor to estimate a distance and a velocity of the one or more obstacles. The frequency of the beat signal is proportional to the range (distance) of the one or more obstacles.

For a moving obstacle, a phase of the beat signal varies across multiple ramp signals transmitted by the radar system. The frequency and phase of the beat signal from one or more receive units are analyzed by the processor to estimate the position and the velocity of the one or more obstacles.

The transmit signal from the local oscillator is provided to the one or more transmit units, and the one or more receiver units, which may be on one or multiple chips and/or semiconductor devices. The multiple transmit units and the multiple receive unit are required for beamforming. Beamforming requires signals transmitted by the multiple transmit units to be phase coherent.

A phase coherence between multiple transmit units is affected by routing delay mismatch. The one or more transmit or receive units may be located at different distances from the local oscillator which induces different routing delays in the transmit signal from the local oscillator to each transmit or receive unit. This routing delay mismatch causes errors in position and velocity estimation of the one or more obstacles.

SUMMARY

According to an aspect of the disclosure, a radar apparatus is provided. The radar apparatus includes a local oscillator that generates a first signal. A first transmit unit receives the first signal from the local oscillator and generates a first transmit signal. A frequency shifter receives the first signal from the local oscillator and generates a second signal. A second transmit unit receives the second signal and generates a second transmit signal. The frequency shifter provides a frequency offset to the first signal based on a routing delay mismatch to generate the second signal such that the first transmit signal is phase coherent with the second transmit signal.

BRIEF DESCRIPTION OF THE VIEWS OF DRAWINGS

DETAILED DESCRIPTION OF THE EMBODIMENTS

Figure 1:
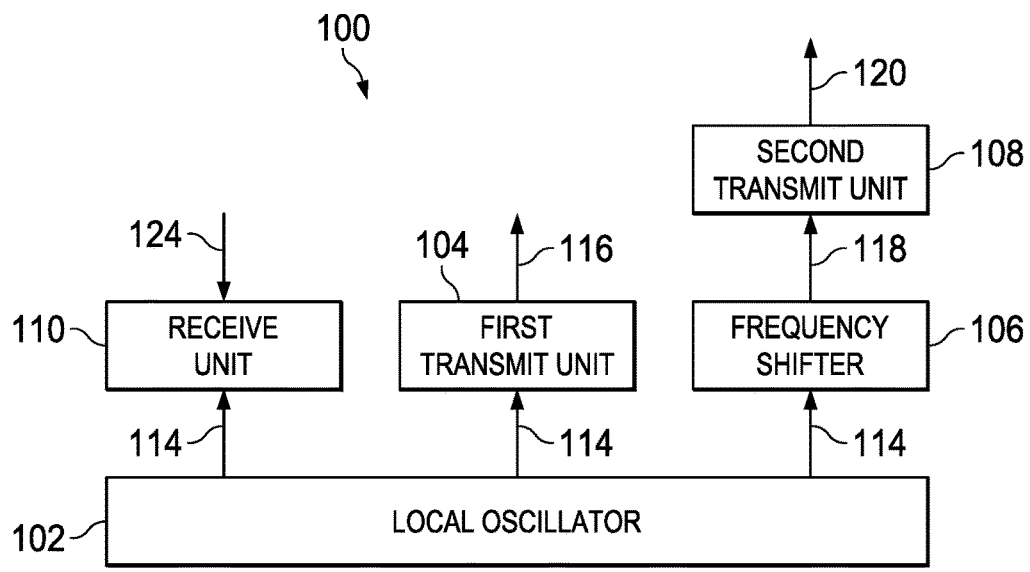
FIG. 1 illustrates a radar apparatus, according to an embodiment.

FIG. 1 illustrates a radar apparatus 100, according to an embodiment. The radar apparatus 100 includes a local oscillator 102, a first transmit unit 104, a frequency shifter 106, a second transmit unit 108 and a receive unit 110. In one version, the first transmit unit 104 and the second transmit unit 108 are similar in operation. The first transmit unit 104 and the frequency shifter 106 are coupled to the local oscillator 102. The second transmit unit 108 is coupled to the frequency shifter 106.

The receive unit 110 is coupled to the local oscillator 102. In one example, the radar apparatus 100 includes one or more transmit units. In another example, the radar apparatus 100 includes one or more receive units. In one version, the first transmit unit 104 and the second transmit unit 108 are integrated on a same chip. In another version, the first transmit unit 104 and the second transmit unit 108 are on different chip. In yet another version, the receive unit 110 is on a chip different from the first transmit unit 104 and the second transmit unit 108.

In an example, the radar apparatus 100 includes multiple local oscillators. The radar apparatus 100 may include one or more additional components known to those skilled in the relevant art and are not discussed here for simplicity of the description.

The operation of the radar apparatus 100 illustrated in FIG. 1 is explained now. The local oscillator generates a first signal 114. In one version, a frequency of the first signal 114 is varied linearly with time. For example, the frequency of the first signal 114 increases at a constant rate from 77 GHz to 81 GHz in 100 micro-seconds. This first signal 114 is also referred as a ramp signal or a chirp signal. In another version, the first signal 114 is a ramp segment having a start frequency and a fixed slope.

The frequency of the local oscillator 102 is one of the following ranges, but not limited to 76 GHz to 81 GHz or 18

GHz to 24 GHz. The frequency of the local oscillator 102, in one example, is dependent on an operating frequency band of the radar apparatus 100. The first transmit unit 104 receives the first signal 114 from the local oscillator 102, and generates a first transmit signal 116. The frequency shifter 106 receives the first signal 114 from the local oscillator 102 and generates a second signal 118. The second transmit unit 108 receives the second signal 118 from the frequency shifter 106 and generates a second transmit signal 120.

The frequency shifter 106 provides a frequency offset to the first signal 114 based on a routing delay mismatch to generate the second signal 118. The frequency offset ensures that the first transmit signal 116 is phase coherent with the second transmit signal 120. The frequency offset is estimated from at least one of the routing delay mismatch and the fixed slope.

In one example, when the routing delay mismatch is 'd', and the fixed slope is 'S', the frequency offset provided by the frequency shifter 106 is given as d*S/c. Further, c which represents a speed of electromagnetic wave varies from 1 m/s to 3×10$^8$ m/s depending on a PCB or chip material used for the radar apparatus 100. In one version, the fixed slope S is selected based on a farthest obstacle required to be detected by the radar apparatus 100. In another version, the slope S is in the range of 1 MHz/micro-second to 200 MHz/micro-second.

The routing delay mismatch is estimated from a time difference between a time instant when the first signal 114 is generated by the local oscillator 102 and a time instant when the first transmit signal 116 is transmitted by the first transmit unit 104. The routing delay mismatch is also estimated from a time difference between the time instant when the first signal 114 is generated by the local oscillator 102 and a time instant when the second transmit signal 120 is transmitted by the second transmit unit 108.

The first transmit unit 104 amplifies the first signal 114 to generate the first transmit signal 116. The second transmit unit 108 amplifies the second signal 118 to generate the second transmit signal 120. The first transmit signal 116 and the second transmit signal 120 are coherent in phase. The first transmit signal 116 and the second transmit signal 120 are scattered by a plurality of obstacles to generate a scattered signal 124.

The scattered signal 124 is received by the receive unit 110. The receive unit 110 amplifies the scattered signal 124 to generate an amplified scattered signal. The amplified scattered signal is mixed with the first signal 114 to generate an IF (intermediate frequency) signal. The IF signal is sampled in the receive unit 110 to generate a sampled data. A position and a velocity of the plurality of obstacles is estimated from the sampled data.

In another embodiment, the frequency shifter 106 is between the receive unit 110 and the local oscillator 102. The first signal 114 generated by the local oscillator 102 is provided a frequency offset by the frequency shifter 106, and a signal generated by the frequency shifter 106 is provided to the receive unit.

Thus, the radar apparatus 100 provides compensation of routing delay mismatches by providing frequency offset. The frequency shifter 106 provides that the transmit and receive units can be on one or multiple chips and/or semiconductor devices without any concern about routing delay mismatch. Intra-chip routing delay mismatches can also be compensated using techniques discussed in connection with radar apparatus 100.

As frequency range of newly developed FMCW radar increases to a range of 160 GHz, the use of beamforming is required for correct estimation of the position and the velocity of the plurality of obstacles. The radar apparatus 100 provides that a phase coherence between multiple transmit units (for example, first transmit unit 104 and the second transmit unit 108) is not affected by routing delay mismatch.

Figure 2:
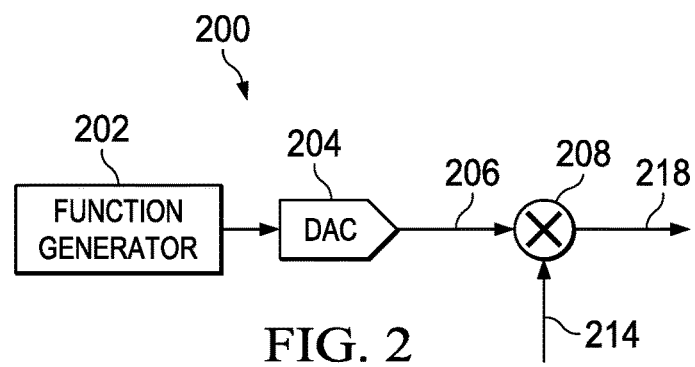
FIG. 2 illustrates a frequency shifter, according to an embodiment.

FIG. 2 illustrates a frequency shifter 200, according to an embodiment. The frequency shifter 200 is similar in connections and operation to the frequency shifter 106 illustrated in FIG. 1. The frequency shifter 200 is explained in connection with the radar apparatus 100. The frequency shifter 200 includes a function generator 202, a digital to analog converter (DAC) 204 and a mixer 208.

The function generator 202 receives a frequency offset value and generates a digital signal. In an example, the function generator 202 receives the frequency offset value from a processor in the radar apparatus 100. In another example, the function generator 202 maintains a look-up table of sine and cosine function values.

The DAC 204 is coupled to the function generator 202. The DAC 204 generates an analog signal 206 corresponding to the digital signal received from the function generator 202. A mixer 208 is coupled the DAC 204. The mixer 208 receives the analog signal 206 and a first signal 214. The first signal 214 is similar to the first signal 114 generated by the local oscillator 102 (illustrated in FIG. 1).

The mixer 208 multiplies the analog signal 206 and the first signal 214 to generate the second signal 218. The second signal 218 is similar to the second signal 118 generated by the frequency shifter 106 in radar apparatus 100. The second signal 218 thus generated by the mixer 208 is obtained by providing a frequency offset to the first signal 214. The frequency offset is defined by the frequency offset value received in the function generator 202.

In another embodiment, the frequency shifter 200 is implemented using a variable delay line. In this method, the first signal 214 is sent through the variable delay line, whose delay is varied in proportion to the frequency offset, such that a desired frequency shift is provided to the first signal 214.

Figure 3:
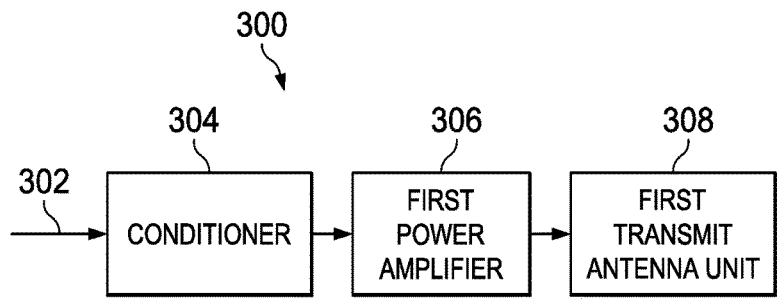
FIG. 3 illustrates a transmit unit, according to an embodiment.

FIG. 3 illustrates a transmit unit 300, according to an embodiment. The transmit unit 300 is similar to the first transmit unit 104 in connection and operation. The transmit unit 300 includes a conditioner 304 that receives a first signal 302. The first signal 302 is similar to the first signal 114 generated by the local oscillator 102 in the radar apparatus 100.

A first power amplifier 306 is coupled to the conditioner 304. In an embodiment, the transmit unit 300 does not include the conditioner 304 and the first power amplifier 306 receives the first signal 302. A first transmit antenna unit 308 is coupled to the first power amplifier 306. The transmit unit 300 may include one or more additional components known to those skilled in the relevant art and are not discussed here for simplicity of the description.

The operation of the transmit unit 300 illustrated in FIG. 3 is explained now. The conditioner 304 is configured to perform at least one of a phase shift operation, a frequency multiplication and a pre-amplification of the first signal 302. In an example, the conditioner 304 is configured to generate an output signal which is an integer multiple of a frequency of the first signal 302. In one version, the integer is one of the following (but not limited to) 1, 2, 3 and 4.

The first power amplifier 306 receives the first signal 302 from the conditioner 304 and amplifies the first signal 302 to generate the first transmit signal. The first transmit antenna unit 308 transmits the first transmit signal received from the first power amplifier 306.

Figure 4:
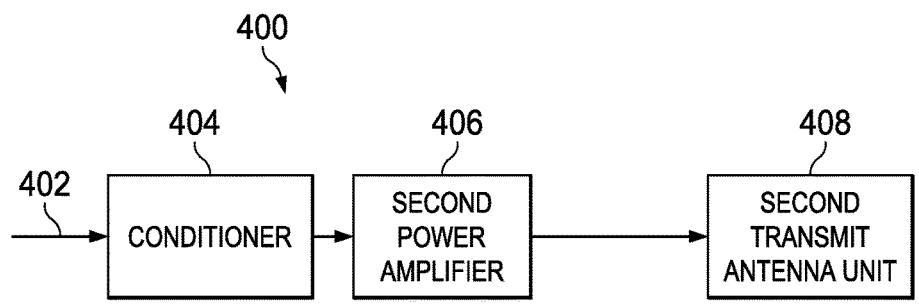
FIG. 4 illustrates a transmit unit, according to an embodiment.

FIG. 4 illustrates a transmit unit 400, according to an embodiment. The transmit unit 400 is similar to the second transmit unit 108 in connection and operation. The transmit unit 400 includes a conditioner 404 that receives a second signal 402. The second signal 402 is similar to the second signal 118 generated by the frequency shifter 106 in the radar apparatus 100.

A second power amplifier 406 is coupled to the conditioner 404. In an embodiment, the transmit unit 400 does not include the conditioner 404 and the second power amplifier 406 receives the second signal 402. A second transmit antenna unit 408 is coupled to the second power amplifier 406. The transmit unit 400 may include one or more additional components known to those skilled in the relevant art and are not discussed here for simplicity of the description.

The operation of the transmit unit 400 illustrated in FIG. 4 is explained now. The conditioner 404 is configured to perform at least one of a phase shift operation, a frequency multiplication and a pre-amplification of the second signal 402. In an example, the conditioner 404 is configured to generate an output signal which is an integer multiple of a frequency of the second signal 402. In one version, the integer is one of the following (but not limited to) 1, 2, 3 and 4.

The second power amplifier 406 receives the second signal 402 from the conditioner 404 and amplifies the second signal 402 to generate the second transmit signal. The second transmit antenna unit 408 transmits the second transmit signal received from the second power amplifier 406.

In one example, a routing delay between the second power amplifier 406 and the second transmit antenna unit 408 is greater than a routing delay between the first power amplifier 306 and the first transmit antenna unit 308. This introduces routing delay mismatch in the radar apparatus 100. The radar apparatus 100 provides compensation of routing delay mismatches by providing frequency offset using the frequency shifter 106.

Figure 5:
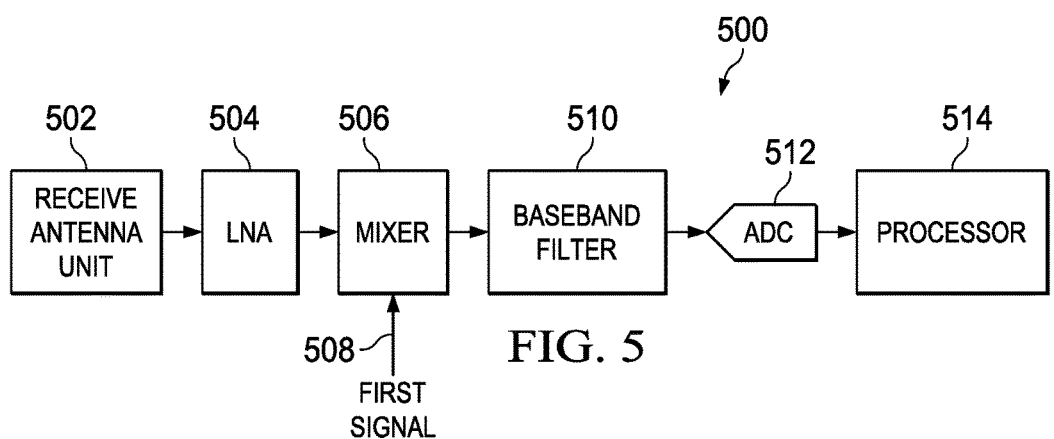
FIG. 5 illustrates a receive unit, according to an embodiment.

FIG. 5 illustrates a receive unit 500, according to an embodiment. The receive unit 500 is similar to the receive unit 110 in the radar apparatus 100. The receive unit 500 includes a receive antenna unit 502. A low-noise amplifier (LNA) 504 is coupled to the receive antenna unit 502. A mixer 506 is coupled to the LNA 504 and also receives a first signal 508. The first signal 508 is similar to the first signal 114 generated by the local oscillator 102 in the radar apparatus 100.

In one example, a multiplier receives the first signal 508 and provides the first signal 508 to the mixer 506. A baseband filter 510 is coupled to the mixer 506. An ADC 512 is coupled to the baseband filter 510. In an embodiment, the baseband filter 510 is not present in the receive unit 500 and the ADC 512 is coupled to the mixer 506. A processor 514 is coupled to the ADC 512. The receive unit 500 may include one or more additional components known to those skilled in the relevant art and are not discussed here for simplicity of the description.

The operation of the receive unit 500 illustrated in FIG. 5 is explained now. In radar apparatus 100, the first transmit signal 116 and the second transmit signal 120 are scattered by a plurality of obstacles to generate a scattered signal. The receive antenna unit 502 receives the scattered signal. The LNA 504 amplifies the scattered signal to generate an amplified scattered signal.

The mixer 506 mixes the amplified scattered signal from the LNA 504 and the first signal 508 to generate an intermediate frequency (IF) signal. In one example, the first signal 508 is received through a conditioner which is configured to amplify and filter the first signal 508. The baseband filter 510 filters the IF signal.

The ADC 512 receives the IF signal and samples the IF signal to generate a sampled data. The processor 514 receives the sampled data from the ADC 512 and estimates a position and a velocity of the plurality of obstacles from the sampled data. In an example, in the radar apparatus 100, the processor 514 is coupled to the frequency shifter 106. The processor 514 provided a frequency offset value to the frequency shifter 106.

In one example, the processor 514 estimates the frequency offset from at least one of the routing delay mismatch and a fixed slope of the first signal 508. In another example, the processor 514 is coupled to a local oscillator, for example the local oscillator 102 in the radar apparatus 100. The processor 514 provides values of a start frequency and a fixed slope of the first signal 508 (or the first signal 114).

The foregoing description sets forth numerous specific details to convey a thorough understanding of the invention. However, it will be apparent to one skilled in the art that the invention may be practiced without these specific details. Well-known features are sometimes not described in detail in order to avoid obscuring the invention. Other variations and embodiments are possible in light of above teachings, and it is thus intended that the scope of invention not be limited by this Detailed Description, but only by the following Claims.

What is claimed is:
1. A radar apparatus comprising
  a local oscillator configured to generate a first signal;
  a first transmit unit configured to receive the first signal from the local oscillator and configured to generate a first transmit signal,
  a frequency shifter configured to receive the first signal from the local oscillator and configured to generate a second signal; and
  a second transmit unit configured to receive the second signal and configured to generate a second transmit signal, wherein the frequency shifter is configured to provide a frequency offset to the first signal based on a routing delay mismatch to generate the second signal such that the first transmit signal is phase coherent with the second transmit signal.

2. The radar apparatus of claim 1, wherein the frequency shifter comprises:
  a function generator configured to receive a frequency offset value and generates a digital signal;
  a digital to analog converter (DAC) coupled to the function generator and configured to generate an analog signal corresponding to the digital signal, and
  a mixer configured to multiply the analog signal and the first signal to generate the second signal.

3. The radar apparatus of claim 1, wherein the first transmit unit comprises:
  a first power amplifier coupled to the local oscillator and configured to amplify the first signal to generate the first transmit signal; and a first transmit antenna unit coupled to the first power amplifier and configured to transmit the first transmit signal received from the first power amplifier.

4. The radar apparatus of claim 3, wherein the second transmit unit comprises:
a second power amplifier coupled to the frequency shifter and configured to amplify the second signal to generate the second transmit signal; and
a second transmit antenna unit coupled to the second power amplifier and configured to transmit the second transmit signal received from the second power amplifier.

5. The radar apparatus of claim 4, wherein the routing delay mismatch is estimated from a routing delay from the local oscillator to the first transmit antenna unit, and from a routing delay from the local oscillator to the second transmit antenna unit.

6. The radar apparatus of claim 1, wherein the first transmit signal and the second transmit signal are scattered by a plurality of obstacles to generate a scattered signal.

7. The radar apparatus of claim 1 further comprising a receive unit, the receive unit comprising:
a receive antenna unit configured to receive the scattered signal;
a low-noise amplifier (LNA) coupled to the receive antenna unit and configured to amplify the scattered signal to generate an amplified scattered signal;
a mixer coupled to the LNA and the local oscillator, the mixer configured to mix the amplified scattered signal and the first signal to generate an IF (intermediate frequency) signal;
an ADC (analog to digital converter) coupled to the mixer and configured to sample the IF signal to generate a sampled data; and
a processor coupled to the ADC and configured to estimate a position and a velocity of the plurality of obstacles from the sampled data.

8. The radar apparatus of claim 1, wherein the first signal is a ramp segment having a start frequency and a fixed slope.

9. The radar apparatus of claim 8, wherein the frequency offset is estimated from at least one of the routing delay mismatch and the fixed slope.

10. A method comprising:
generating a first signal;
generating a first transmit signal from the first signal;
providing a frequency offset to the first signal based on a routing delay mismatch to generate a second signal; and
generating a second transmit signal from the second signal, wherein the first transmit signal is phase coherent with the second transmit signal.

11. The method of claim 10 further comprising estimating the routing delay mismatch from a time difference between a time instant when the first signal is generated and a time instant when the first transmit signal is transmitted, and from a time difference between the time instant when the first signal is generated and a time instant when the second transmit signal is transmitted.

12. The method of claim 10 further comprising amplifying the first signal to generate the first transmit signal, and amplifying the second signal to generate the second transmit signal.

13. The method of claim 10 further comprising scattering of the first transmit signal and the second transmit signal by a plurality of obstacles to generate a scattered signal.

14. The method of claim 13 further comprising:
amplifying the scattered signal to generate an amplified scattered signal;
mixing the amplified scattered signal and the first signal to generate an IF (intermediate frequency) signal;
sampling the IF signal to generate a sampled data, and estimating a position and a velocity of the plurality of obstacles from the sampled data.

15. The method of claim 10, wherein the first signal is a ramp segment having a start frequency and a fixed slope.

16. The method of claim 15 further comprising estimating the frequency offset from at least one of the routing delay mismatch and the fixed slope.

* * * * *